United States Patent

[11] 3,596,096

[72] Inventor Toivo Koehler
 Cambridge, Mass.
[21] Appl. No. 19,363
[22] Filed Mar. 13, 1970
[45] Patented July 27, 1971
[73] Assignee The United States of America as
 represented by the Secretary of the Air
 Force

[54] DUAL TEMPERATURE APPARATUS FOR
 TESTING INFRARED RADIATION DETECTORS
 2 Claims, 7 Drawing Figs.
[52] U.S. Cl. .................................................. 250/83.3 H,
  73/355 R
[51] Int. Cl. ..................................................... G01j 5/20
[50] Field of Search ........................................... 250/83.3 H,
  83 C; 73/355 R, 1 F

[56] References Cited
UNITED STATES PATENTS
2,909,908 10/1959 Pastuhov ..................... 73/355 R X Primary Examiner—James W. Lawrence
Assistant Examiner—Morton J. Frome
Attorneys—Harry A. Herbert, Jr. and Robert Kern Duncan ABSTRACT: A device for independently adjusting the temperature of an infrared detector and the temperature of a background shield surrounding the detector so that the detector performance characteristics can be correlated with its temperature and the temperature of the background in which it operates. The temperatures are established by two independently adjustable cryogenic tip dewars, one of which is attached to the detector and the other of which is attached to the background shield. The background shield and detector are enclosed in an evacuated container which has an infrared transmitting window through which infrared radiation enters the test apparatus.

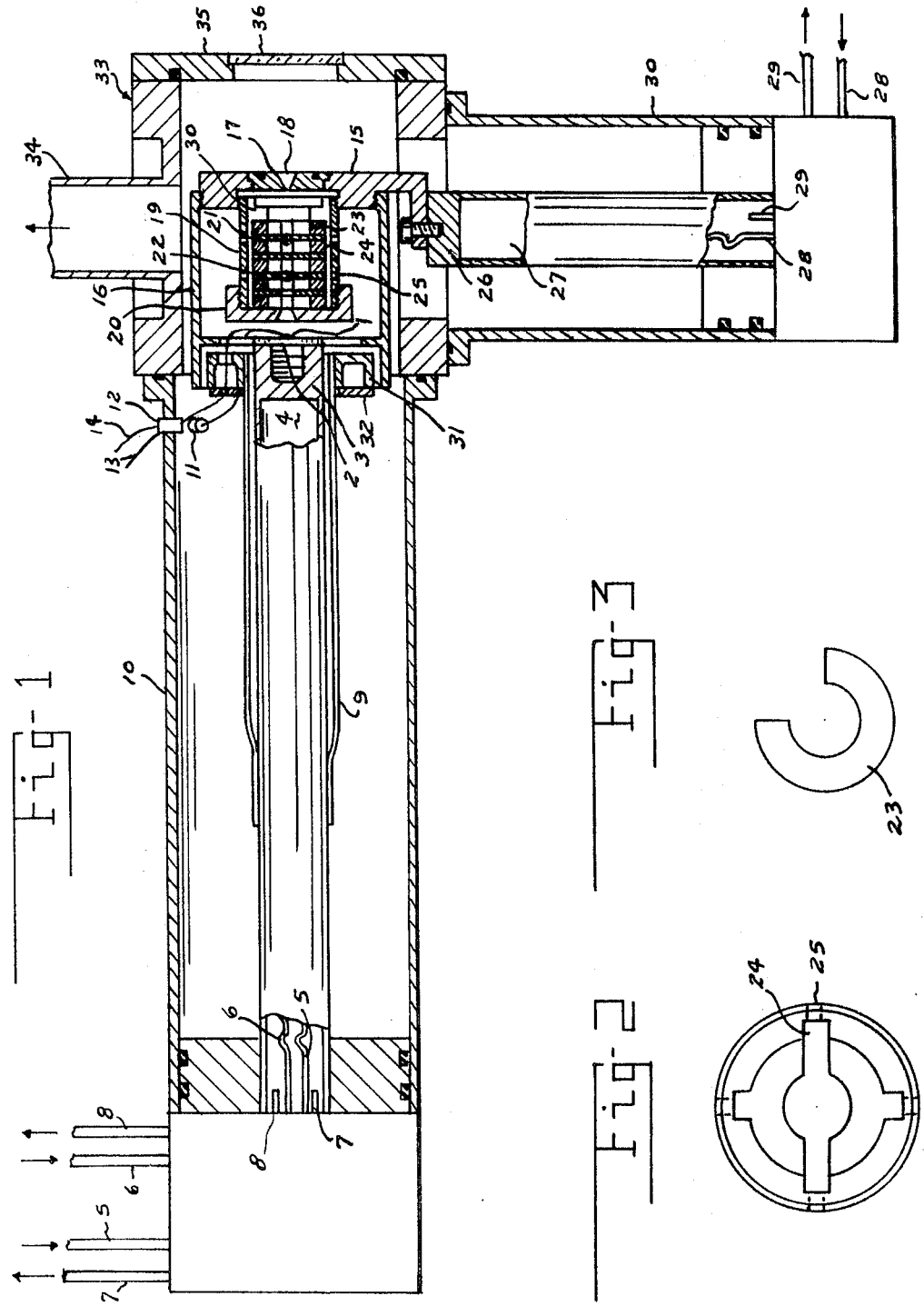

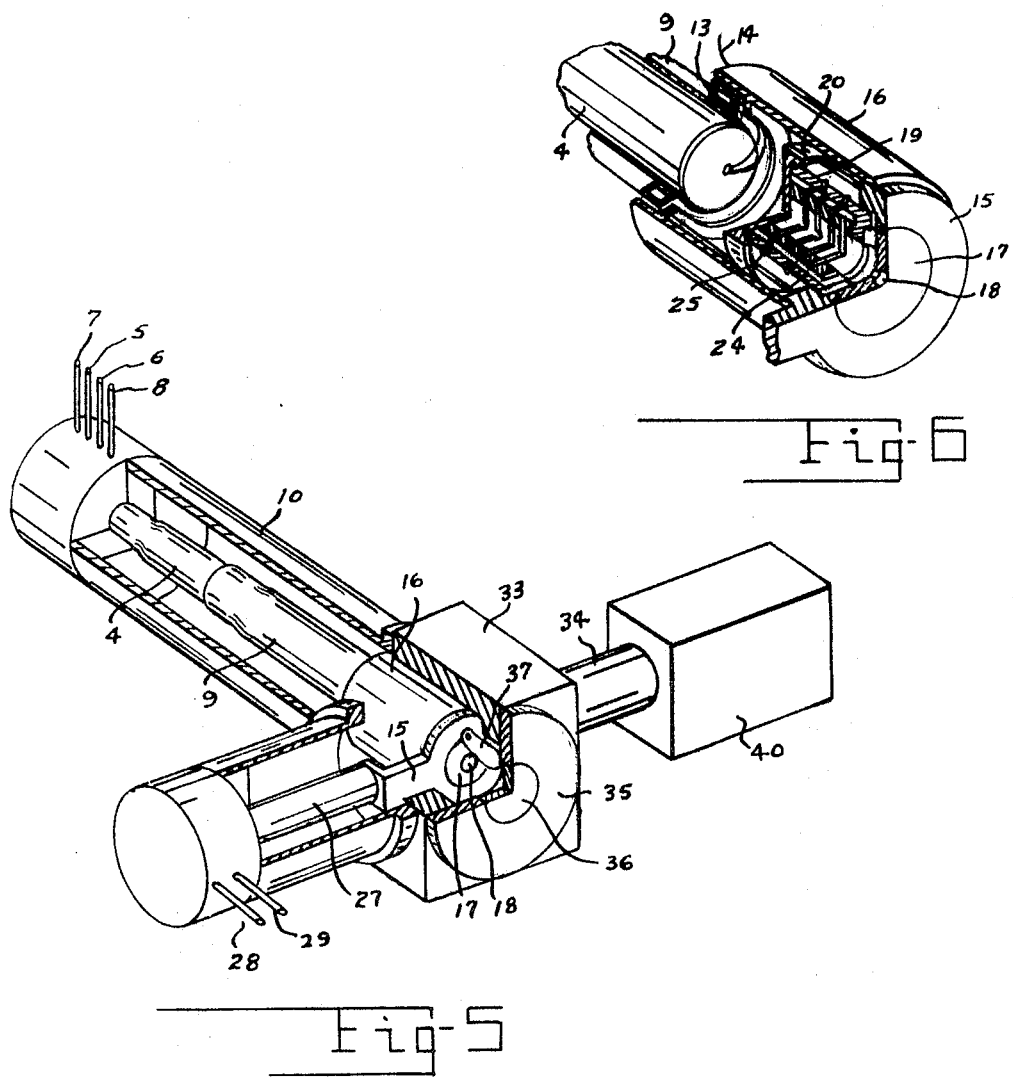

INVENTOR.
TOIVO KOEHLER
BY Harry A. Herbert Jr
ATTORNEY 3,596,096

DUAL TEMPERATURE APPARATUS FOR TESTING INFRARED RADIATION DETECTORS

BACKGROUND OF THE INVENTION

1. Field of the Invention

Testing of infrared radiation detectors.

2. Description of the Prior Art

The characteristics of infrared detectors such as lifetime, detectivity, resistance, and responsivity are influenced by their temperatures and by the background temperatures of the environments in which they operate. In order to be able to accurately predict how a detector will perform under given environmental conditions, it is necessary to be able to test the detector while it is operating in a control apparatus which can both set the detector temperature and at the same time independently adjust the background temperature of the detector, thereby simulating various environments in which the device might operate. The technique of cooling infrared detectors with cryogenic tip dewars is known to the art, but a test device which independently controls both the temperature of infrared detectors and the background temperature in which they operate by using cryogenic tip dewars is believed to be novel.

SUMMARY OF THE INVENTION

The invention provides independent temperature controls over the operation of an infrared radiation detector, one control establishing the temperature of the detector and the other establishing the temperature of the detector's background environment. By using these controls it is possible to study the detector's characteristics such as its lifetime, detectivity ($D^*$), resistance, and responsivity under different temperature conditions. The invention comprises a means for mounting a 180° infrared detector chip on a hydrogen nitrogen cryogenic tip dewar which establishes its temperature; a background shield containing baffles, spacers, and neutral density filters through which the infrared radiation must pass before reaching the detector chip, and a field of view (FOV) limiting aperture which limits the viewing angle of the detector chip to the desired number of degrees; a nitrogen cryogenic tip dewar which attaches to the background shield and cools it to the desired temperature thereby establishing the environmental background temperature of the detector chip; a sealed container of vacuum shroud in which the detector chip and background shield are enclosed; a vacuum pump attached to the container for evacuating the entire system; an IRTRAN of infrared transmitting window in the container through which the infrared rays pass into the system; and hermetically sealed electrical feed throughs in the hydrogen nitrogen dewar for passing electrical leads from the detector chip outside the system so that information about the detector can be gathered.

DESCRIPTION OF THE DRAWINGS

FIG. 1 is a top cutaway view of the device;

FIG. 2 is a rear view of the filter and baffle tube of the device;

FIG. 3 shows the type of spacers used in the baffle tube;

FIG. 5 is a cutaway view of the deice showing the arrangement of elements inside the vacuum shroud;

FIG. 6 is a cutaway view of the device showing the arrangement of elements inside the background shield and the baffle tube.

DESCRIPTION OF THE PREFERRED EMBODIMENT

Figure 4:
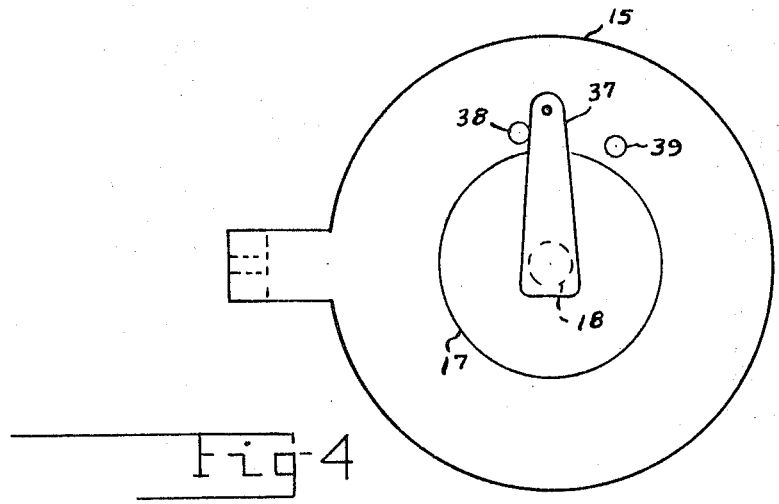
FIG. 4 is a front view of the bracket piece and gravity shutter of the device.
Figure 7:
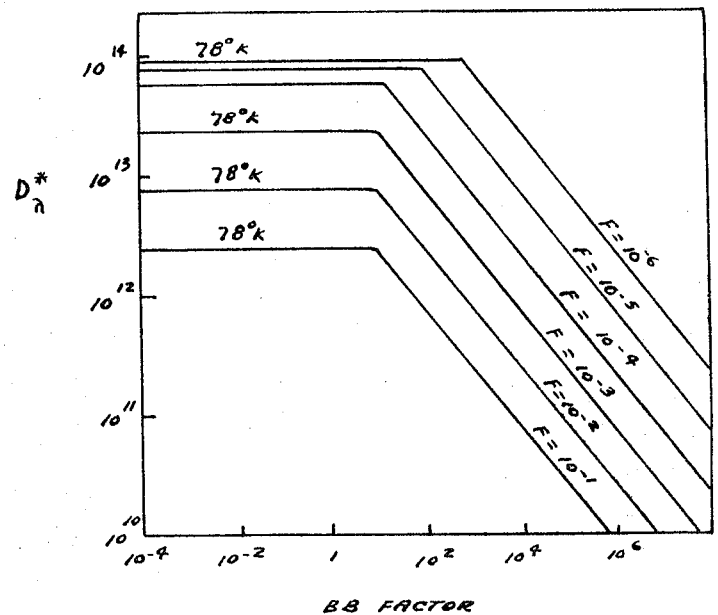
FIG. 7 is a graph of the theoretical detectivity of a detector as a function of the photon flux from a blackbody infrared signal source for a given background shield temperature.

Referring to FIG. 1, a 180° infrared detector chip 1 to be tested is attached by a suitable adhesive to a detector mount 2 which is screwed into nitrogen-hydrogen cryogenic tip 3 which cools the detector chip to a predetermined temperature. A suitable adhesive for mounting the detector chip would be any rubber silicon adhesive such as either RTD 861 or RTD 863 which are made by General Electric Company. Cryogenic tip 3 is cooled by hydrogen and nitrogen gases which are deposited into the hollow interior 4 of cryogenic tip 3 through tubes 5 and 6, and removed through tubes 7 and 8. A radiation shield 9 and an outer dewar tube 10 inclose the inner dewar tube and the space between the inner tube and the outer tube is evacuated. The outer dewar tube contains suitable hermetically sealed feed troughs 11 and 12 through which electrical leads 13 and 14 pass into the device for attachment to the detector chip. Adjustable cryogenic tip dewar refrigerators which use hydrogen and nitrogen gases for cooling infrared detectors are available off the shelf commercially, an example being the "Cryo Tip" refrigerator Model AC—2—110 made by Air Products Corporation, which can regulate any detector chip temperature between 18° K. and 200° K.

The background shield through which the infrared radiation must pass before it strikes the detector chip consists of bracket piece 15 and hollow cylindrical member 16. Field of view limiting aperture cap 17 screws into the front of bracket piece 15 and contains field of view limiting aperture 18 which limits the field of view of the detector chip to 5°. Filter and baffle tube 19 screws into the rear of bracket piece 15, and filter and baffle tube cap 20 is threaded onto the rear of tube 19. The filter and baffle tube contain filters such as filter 21, baffles such as baffle 22, and spacers such as spacer 23, along with keyways such as keyway 24, and holes such as hole 25, which make it possible to evacuate the hollow areas inside the spacers between the filters and baffles. The filter tube cap and baffles are drilled through their centers in order to allow the passage of radiation through the detector chip. The background shield bracket piece 15 is screwed onto nitrogen cryo tip 26 which cools it to a predetermined temperature and which is cooled by nitrogen gas which is deposited into inner dewar tube 27 through tube 28 and removed through tube 29. Outer dewar tube 30 incloses the inner dewar tube and the space in between is evacuated as for the hydrogen-nitrogen cryogenic tip dewar. Adjustable cryogenic tip dewar refrigerators using nitrogen gas which are suitable for cooling the background shield are available off the shelf commercially, an example being the "Cryo Tip" refrigerator Model AC–1–110 made by Air Products Corporation, which can regulate a temperature between 27° K. and 300° K.

A light trap 31, which is a hollowed out ring element for preventing radiation emanating from the dewar space between radiation shield 9 and dewar tube 10 from entering the area wherein the detector is located, is inserted between dewar radiation shield 9 and hollow cylindrical member 16. It is positioned so as to make contact with the dewar radiation shield while not contacting the hollow cylindrical member. This is necessary to prevent the background shield elements from being cooled by the same cryogenic tip which cools the detector chip. The light trap is drilled through in order to allow electrical leads 13 and 14 to be attached to the detector chip inside. A solid ring lead shield 32 is attached to the back of the light trap, and is drilled through so as to allow the electrical leads to pass into the light trap. The outer dewar tubes 10 and 30 are attached to vacuum shroud 33 which incloses the detector chip and the background shield elements and contains vacuum port 34 which leads to a vacuum pump. Cover plate 35 containing IRTRAN window 36 is attached to the front of the vacuum shroud. A vacuum pump can evacuate the ares inside the outer dewar shields and inside the vacuum shroud.

The elements of the device can be made from any suitable metal. In one embodiment of the device all the elements including baffles and spacers were made of copper except for the filters and field of view limiting aperture cap 16 which was made of stainless steel Suitable filters are available off the shelf commercially, an example being those produced by Spectrum Systems Incorporated, from metal film evaporated on germanium substrates with 13 percent, 3 percent, and 1 percent transmission from 2 to 35 microns.

FIG. 2 shows the rear view of the filter and baffle tube without the filters, baffles, and spacers. As can be seen from the drawing, two of the keyways extend throughout the length of the tube, while the other two do not.

FIG. 3 is a view of one of the spacers. The spacers are arranged within the filter and baffle tube so that spacer 23 opens onto keyway 24, and the other spacers are rotated so that each spacer is rotated at 90° to the one preceding it. This arrangement makes it possible to evacuate the spaces between filters and at the same time reduce the incidence of light other than that passing through the center of the filter and the baffle tube upon the detector chip.

FIG. 4 is a front view of background shield bracket piece 15 showing gravity shutter 37 which is attached to the background shield bracket piece so as to pivot freely when the device is tilted. Pins 38 and 39 extend from the bracket piece and support the shutter so that field of view limiting aperture 17 is either opened or closed, depending on which way the device is tilted.

FIG. 5 is a cutaway view of the device showing the elements of the device inside the outer dewar shields and the vacuum shroud. Vacuum pump port 34 is attached to vacuum pump 40. In one embodiment of the device the device was evacuated with an absorption pump and then switched to a 1 liter per second capacity vac-ion pump which maintained vacuum pressure in the $4 \times 10^{17}$ mm. Hq. range.

FIG. 6 is a cutaway view of the elements of the device inside the background shield.

One example of the usefulness of the device is in the field of detectivity of infrared detectors. The theoretical detectivity ($D_\lambda^*$) limit of the system is determined by the cutoff wavelength of the detector, the attenuation factor in the optical path, the photon flux of the infrared radiation source, the photon flux of the irradiance emanating from the room wherein the device is located and the photon flux of the irradiance originating from the cold inside walls of the background shield. If the device is operated in surroundings at room temperature of 300° K., with a blackbody infrared signal source at a temperature of 500° K., background shield temperature of 77° F., a 10 micron wavelength cutoff detector, and an attenuation factor of $10^{16}$ the theoretical $D_\lambda^*$ is $9.25 \times 10^{13}$ cm. Hz.$^{1/2}$/watt. This $D_\lambda^*$ value is calculated as follows:

$$D_\lambda^* = \frac{\lambda c}{2hc\sqrt{J^T_{o-\lambda c}}}$$

$\lambda c$ = cutoff wavelength of the detector = $10\mu = 10^{13}$ cm.
$h$ = Plancks constant = $6.6256 \times 10^{-34}$ watt sec.$^2$/photon
$c$ = speed of light = $3 \times 10^{10}$ cm./sec.
$J^T_{o-\lambda c}$ = total photon flux up to the cutoff wavelength striking the detector.

$J^T_{o-\lambda c}$ is calculated by adding the background flux from the room temperature environment of the system, ($T = 300°$K), the background flux from the cold background shield, ($T = 77°$K), and the flux from the blackbody source, ($T = 500°$K).

$$J^T_{o-\lambda} = J_{o-\lambda c}(300°K.) \sin^2\theta \cdot F +$$
$$J^B_{o-\lambda c}(77°K.) \cos^2\theta \cdot E +$$
$$J^S_{o-\lambda c}(500°K.)\frac{A}{R^2} \cdot F$$

where
$$\theta = \frac{FOV}{2} = \frac{5°}{2} = 2.5°$$
$\sin^2\theta = 1.9 \times 10^{13}$
$\cos^2\theta = 1$
$F$ = neutral density filter attenuation factor = $10^{16}$
$E$ = emissivity of cold background = 1
$A$ = area of blackbody aperture = 0.00456 cm.$^2$
$R$ = distance from blackbody to detector = 15 cm.

$$J^B_{o-\lambda c}(300°K.) = (4 \times 10^{16})(.12) \frac{\text{photons}}{\text{cm.}^2 \text{ second}}$$

$$J^B_{o-\lambda c}(77°K.) = (7.2 \times 10^{16})(9.5 \times 10^{-7}) \frac{\text{photons}}{\text{cm.}^2 \text{ second}}$$

$$J^S_{o-\lambda c}(500°K.) = (1.9 \times 10^{19})(.39) \frac{\text{photons}}{\text{cm.}^2 \text{ second}}$$

$$J^B_{o-\lambda c}(300°K.) \sin^2\theta \cdot F = 9.12 \times 10^8 \frac{\text{photons}}{\text{cm.}^2 \text{ second}}$$

$$J^B_{o-\lambda c}(77°K.) \cos^2\theta \cdot E = 700 \times 10^8 \frac{\text{photons}}{\text{cm.}^2 \text{ second}}$$

$$J^S_{o-\lambda c}(500°K.) \cdot \frac{FA}{R^2} = 3.89 \times 10^8 \frac{\text{photons}}{\text{cm.}^2 \text{ second}}$$

$$J^T_{o-\lambda c} = 713.01 \times 10^8 \frac{\text{photons}}{\text{cm.}^2 \text{ second}}$$

Substituting into the original formula yields $D_\lambda^* = 9.25 \times 10^{13}$ cm. Hz.$^{1/2}$/watt. FIG. 3 shows the $D_\lambda^*$ as a function of a blackbody source flux for various attenuation factors and a constant background shield temperature of 77° K. The $D_\lambda^*$ values are on the ordinate and the blackbody source flux values are on the abscissa and are shown as multiples of the flux for a 500° blackbody source, "1" corresponding to that flux. As can be seen from FIG. 3, the $D_\lambda^*$ of the system is almost entirely dependent on the background temperature of the system until a certain blackbody source flux is reached, at which point the $D_\lambda^*$ becomes blackbody source flux controlled. This fact makes it possible to directly correlate theoretical detector performance with blackground temperature for certain blackbody source signal flux ranges, and then compare theoretical performance with actual performance in these ranges.

I claim:

1. A dual temperature apparatus for testing infrared radiation detectors comprising, in combination, an adjustable cryogenic tip dewar means for supporting and cooling an infrared detector to a predetermined temperature; a background shield spatially separated from the detector chip cooling means and surrounding the detector for providing a predetermined environmental temperature for the operation of the detector, said environmental temperature being independent of the predetermined detector temperature; means providing a field of view limiting aperture in the background shield through which infrared radiation enters the area enclosed by the background shield and reaches the detector; means located within and attached to the background shield and positioned between said aperture and the detector for attenuating the infrared radiation which passes through the aperture before said radiation is incident upon the detector; a second adjustable cryogenic top dewar means having a thermally conductive attachment to the background shield for cooling the background shield to a predetermined temperature which is independent of the detector temperature; a sealed enclosure communicating with both dewar means for containing the detector chip, the background shield, and infrared radiation attenuating means is a relative vacuum; a vacuum pump communicating with the enclosure for producing and maintaining said vacuum; an infrared transmitting window in the enclosure opposite said aperture for admitting infrared radiation into the vacuum enclosure and to the aperture; and hermetically sealed electrical feed through means positioned within the detector chip cooling means for passing electrical leads from the detector chip through the evacuated enclosure and out of the device.

2. Apparatus as claimed in claim 1 in which said infrared radiation attenuating means comprises a hollow tube element with a plurality of hollow keyways longitudinally transversing said tube element and opening onto the inner bore of said tube element, said tube element being bored through from its outer surface to said keyways in a plurality of locations; a plurality of circular baffles with radii equal to the inner bore radius of the tube element, which have been bored through their centers, positioned within said hollow tube element for blocking light rays other than those passing through their centers, a plurality of solid circular radiation filters, with radii equal to the inner bore radius of the tub element positioned within said hollow tube element, and a plurality of circular spacers, with radii equal to the inner bore radius of the tube element, which have been bored through their centers and notched from their outer edges to their center bores, positioned within the tube element between the filters and baffles with their notched edges opening upon the keyways of said tube element, the first of said spacers being positioned between the end of said hollow tube element which communicates with the background shield and the first filter, and the other spacers being rotated at various angles to said first spacer, thereby creating a path from the area outside the background shield and the areas between the filters and baffles through the keyways and on through the outer surface of the hollow tube element, whereby the areas between the filters and baffles and the area enclosed by the background shield in which the infrared radiation attenuating means is located can be evacuated.